3,562,198
EPOXIDE RESIN SOLUTION
Robert J. Slocombe, St. Louis, Mo., assignor to Monsanto Company, St. Louis, Mo., a corporation of Delaware
No Drawing. Filed Oct. 26, 1967, Ser. No. 678,181
Int. Cl. C08g 51/04
U.S. Cl. 260—37   5 Claims

ABSTRACT OF THE DISCLOSURE

A solution, in an inert, organic liquid solvent, comprising an epoxide resin which has been partially cured by a hydrocarbon amine curing agent; the method of preparing the partially cured resin in a liquid media; and the method of preparing moldable grains comprising filler particles enveloped by the partially cured resin which comprises mixing the solution with the particles, treating the mixture with a liquid which is miscible with the solvent of said solution and is a non-solvent for the partially cured resin, and recovering the grains.

---

The invention described herein was made in the course of or under a contract or subcontract thereunder with the U.S. Department of Defense, Office of Naval Research.

BACKGROUND OF THE INVENTION (1) Field of the invention

Filler-reinforced epoxide resins and molding compositions thereof.

(2) Background of the invention

In the manufacture of composites comprising an epoxide resin and a particulate filler, a normally liquid, "A" stage resin is mixed with a curing agent therefor and the filler particles, which may or may not have been pretreated with a coupling agent, i.e., a material such as a bifunctional silane which facilitates bonding between resin and filler. The resulting mass is then placed in a mold before it has had time to set; otherwise, compression molding into the desired shape would be hindered. This method is not conducive to uniform distribution of the filler particles within the finished composite; not only uniform pre-mixing of the components is a factor, more importantly, compression of the mixture often induces stratification of the filler so that the composite strength differs throughout its structure. For that reason, in the epoxide art, the reinforcement is frequently in textile or braided or continuous filament form; filler in such forms can first be impregnated with a solution of the resin components, the impregnated materials stacked or otherwise arranged into the desired shape, and then compression molded without substantial shifting of the filler with respect to the matrix resin. Here again, however, rapid operation is necessary. The solution of "A" stage epoxide and curing agent is unstable. This is particularly true when the curing agent is a hydrocarbon amine; such amines, while facilitating the curing in substantially the shortest time, are extremely reactive with the epoxide. Therefore, to obtain even distribution of the matrix precursors upon the filler, the solution of resin and curing agent must be used soon after it has been prepared. This requires that the molder do his own mixing; and packaged assortments of "A" stage resin, curing agent and solvent in separate containers are commercial articles of commerce, for use in laminate manufacture, from, say, glass fiber cloth.

In reinforcing filler composites, not only the type of filler but also its size and shape are significant. The behavior of a system having continuous lengths of fiber or textiles made therefrom is different from one in which the filler is discontinuous. Very short lengths of fiber, e.g., fibers having a length of only a few microns and up to, say ½ inch have been found to confer great strength to epoxide composites; and since glass fiber has long been known to be a high strength material, continuous lengths of the fiber, either before or after coating with an epoxide resin, have been chopped into small pieces. However, when the uncoated glass fiber is chopped and treated with a solution of epoxide resin and curing agent therefor, the fibers form a mat or felt, clumping together as the resin reacts with the curing agent. On the other hand, when the continuous fiber is coated with a solution of epoxide resin plus curing agent, dried, and then chopped, the pieces have sharp, frayed ends which often protrude through the surface of the finished molding and which prevent their use in flow molding processes.

Recently, very short fibers or whiskers possessing enormously high strengths, e.g., boron fiber or silicon nitride whiskers, have become available. Much effort has been expended at arriving at optimum means for incorporation of these very thin materials into heat-resistant matrix resin systems, for the high pressures required to mold the resins are often conducive to fracture of the millimicron thin fibers. Proper utilization of the highly valuable properties of these materials requires that in the composite they be separated from each other by a layer of the matrix resin; but, in view of the propensity of the fine materials to aggregate, this has been hard to achieve, either by compression molding of a mixture of liquid resin, curing agent and filler or by treating the filler with a solution of the liquid, "A" stage resin and curing agent to form a prepreg upon drying.

Uniform dispersion in the matrix is, of course, the goal for all types of particulate-filled systems. Aggregates are to be avoided: weak intra-bonding can be a flaw resulting in fracture of the composite. The individual filler particles should be separated from one another and wetted individually by the matrix phase. Agglomerates also tend to contain voids and air spaces, and unless they have appreciable mechanical strength so that they are not readily broken up, the filled material will be weakened thereby.

It is thus obvious that provision of a particulate-reinforced epoxide composite having even adequate mechanical properties presents many pitfalls. Production of the thermoset epoxide matrix is complicated by the fact that reaction between prepolymer and curing agent is involved and thus usually limits fabrication to compression laminates. Flow molding is generally shunned because it is difficult thereby to provide for uniform distribution of the particulate filler in the resin matrix.

The present invention overcomes many of the previously encountered obstacles. It provides a solution of curable epoxide resin which may be stored for long periods previous to molding, and the provision of such a solution makes possible the method of forming moldable grains wherein, unlike the frayed, exposed ends of chopped coated fiber, the particulate filler, whether it be a dust or powder or small platelet or very short fiber, is completely enclosed by the resin. Molded products obtained from such grains have filler uniformly distributed therein because it is packaged within the resin previous to molding.

SUMMARY OF THE INVENTION

An object of the invention is to provide a substantially stable solution of components which give a completely cured epoxide resin upon heating under pressure. Another object is to employ said solution for the preparation of moldable grains comprising filler particles enveloped by a partially cured epoxide resin.

These and other objects hereinafter disclosed are met by the invention wherein there are provided:

(1) A solution, in an inert, organic liquid solvent, comprising an epoxide resin which has been partially cured by a hydrocarbon amine curing agent. The solution consists essentially of said solvent and the reaction product obtained by reaction of a normally liquid "A" stage epoxide resin with a hydrocarbon amine curing agent in chemical equivalent ratios of 1.1:1.0 to 2.0:1.0 to reduce the oxirane oxygen content by about 40% to 80%. As herein employed, and in the appended claims, the term "chemical equivalent" used in relation to the epoxide resin and the curing agent means the amount of the resin needed to furnish one gram-molecular weight of epoxide function and the amount of the curing agent needed to furnish one gram-molecular weight of amine function. The solution may consist of any amount of said reaction product, but because the stability thereof appears to increase with increasing dilution, it is preferred that said reaction product, hereinafter referred to as the "solids content," be present in the solution in a quantity of up to, say, about 80%, and preferably of up to about 65%, of the weight of the solution. The lower limit of solids content will depend, of course, upon the intended use of the solution. The presently provided solution may be used for any purpose wherein a completely cured epoxide resin is prepared by advancement of the "A" stage resin through the intermediate "B" stage. The nature of the solvent, also, will vary with the intended use.

Because the solids content of the solution are components which give a completely cured epoxide resin upon heating under pressure, said solids are actually precursors of the matrix of any composite made therefrom. Accordingly, for convenience, the solution will be hereinafter referred to as "protomatrix resin solution" and the advanced or partially cured epoxide resin present therein as "B" stage resin.

(2) The method of preparing the partially cured resin in a liquid media. Said method comprises preparing a resinous reaction product which comprises heating a reaction mixture consisting essentially of "A" stage epoxide resin and a hydrocarbon amine curing agent therefor in a chemical equivalent ratio of from 1.1:1.0 to 2.0:1.0 in a mixture of solvents consisting essentially of:

(I) A solvent for the liquid resin and for its partially cured "B" stage product and for the amine, and which boils above the temperature at which substantial advancement of the "A" stage resin to its "B" stage product occurs during the time of said heating, and (II) A solvent for the amine, for the liquid resin and, in admixture with solvent (I) for the "B" stage product of the liquid resin, and which boils below the boiling point of solvent (I) and below the temperature at which substantial advancement of the "A" stage resin to its "B" stage product occurs during the time of said heating, said heating being conducted to distill off said solvent (II) and to obtain as residue a reaction product having an oxirane oxygen content which is from 20% to 50% of that of the reaction mixture before heating. Said residue is generally a thick liquid of high solids content. To prepare the protomatrix solution, it is dissolved in an inert, organic liquid solvent to a solids content which may be as high as 80% by weight.

(3) The method of preparing moldable grains comprising filler particles enveloped by the partially cured resin which comprises mixing the protomatrix solution with the particles, treating the mixture with a liquid which is miscible with the solvent of said solution and is a non-solvent for the partially cured resin, and recovering the grains. Generally, there is prepared a slurry of the filler particles and the protomatrix resin solution, and the slurry is stirred into the liquid, which advantageously contains a suspending agent. The resulting grains are recovered by simply removing the liquid and dried under conditions of time and temperature which are insufficient to advance the resin to the infusible stage.

DESCRIPTION OF THE PREFERRED EMBODIMENTS

Any epoxide resin may be used for preparing the presently provided protomatrix solution. As herein employed, the term "Epoxide" resin includes any resinous material containing the grouping

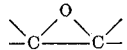

As is well known in the art, the normally liquid "A" stage epoxide resins are generally prepared by reacting polyhydroxy compounds with chlorohydrins and/or polyepoxides or mixtures thereof. Examples of commonly available epoxide resins are those made from epichlorohydrin and such polyhydroxy compounds as 4,4'-isopropylidenediphenol, resorcinol, ethylene glycol, phenol-aldehyde precondensates such as the Novolaks, etc. Examples of presently useful resins which are commercially available are the "Epons" which are manufactured by Shell Chemical Company and the "Araldites" which are manufactured by Ciba Company. Generally, the preferred epoxides are partially aromatic resins of the general formula

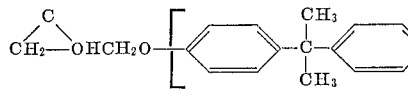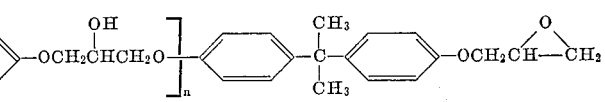

wherein $n$ denotes the degree of polymerization. A commercially available resin of the above formula, for example, is Epon–815, having an average molecular weight of about 300. Other resins of the above general formula are, e.g., Epon–826 and Epon–828. These differ from each other with respect to molecular weight and epoxide equivalent; Epon–815 has an epoxide equivalent of 175–195; whereas that of Epon–826 is 180–188. An important difference between Epon–815 and Epon–826 is that the former contains monofunctional epoxy diluents to give low viscosity; whereas the latter appears to be an undiluted resin with near-theoretical epoxide equivalent. In addition to the above-described Epons, there may be used Epon–834 or –1001 or –1031 or –1064 and Araldite–1064 or –6020. Such materials are generally liquids at temperatures of from about 9° to 80° C. and are in the "A" stage of polymerization.

The epoxide resins are generally characterized by the term "epoxide equivalent weight"; which term indicates the weight of the resin that is equivalent to one gram-molecular weight of epoxide function. This enables easy calculation of the amount of curing agent required by that particular resin to cure it to an infusible stage. In order to advance the polymerization to the "B" stage, whereby the "A" stage resins become fusible solids, the "A" stage resins are reacted with a curing agent under conditions of time and temperature which are insufficient to give complete cure. For the present purpose, wherein substantial stability in the partially cured stage is desired, the curing agent is a hydrocarbon diamine, e.g., diethylenetriamine, triethylenetetramine, ethylenediamine, m - phenylenediamine, 4,4'-methylenedianiline, 4,4'-methylenedi-o-toluidine, toluene-2,5-diamine, 1,2-propanediamine, 1,4-cyclohexane - diamine, 1,5 - naphthalenediamine, 1,6-hexanediamine, etc. Hydrocarbon amines which are free of olefinic and acetylenic unsaturation, and contain from 2 to 4 amine groups and from 2 to 18 carbon atoms are generally useful, and the aliphatic-aromatic diamines are preferred.

For some purposes, in order to obtain products meeting certain specifications, it may be desirable to use a mixture of two or more liquid epoxide resins and/or a mixture of two or more curing agents.

The preferred process of preparing the protomatrix solution comprises mixing together a solution of a liquid "A" stage epoxide resin in a solvent (I) which is a solvent for not only the said "A" stage resin but also for its partially cured "B" stage product and which boils above the temperature at which advancement of the "A" stage resin to its "B" stage occurs, with a solution of a hydrocarbon amine curing agent for said resin in a solvent (II) which, in admixture with solvent (I), dissolves said "B" stage product and which boils at a temperature which is below the boiling point of solvent (I) and below the temperature at which the liquid resin is cured; and distilling said solvent (II) from the resulting mixture to obtain as residue a reaction product wherein the oxirane oxygen content has been reduced by from about 40% to 80%, and preferably by from about 45% to 65%, and dissolving said reaction product in an inert, organic liquid solvent therefor to a solids concentration of from 1% to 80%. The quantity of liquid epoxide resin present in solvent (I) is from 1.1 to 2.0 chemical equivalents times the chemical equivalent of the amine present in solvent (II). An epoxide to curing agent chemical equivalent ratio of from 1.5:1.0 to 2.0:1.0 is preferred.

The nature of the epoxide resin will determine the choice of solvent (I). The "A" stage resins are usually soluble in the polar solvents, e.g., the lower alcohols, whereas the "B" stage resins are not. Although the lower aliphatic ketones such as acetone are usually good solvents for the "B" stage materials, they may not possess boiling points sufficiently high to permit advancing the resin to the "B" stage during the time that solvent (II) is being distilled from the reaction mixture. Because cure is determined by both time and temperature, it will be obvious to extend the reaction time when such low boiling materials are used by simply employing them in greater quantities. More expediently, the aromatic hydrocarbons, e.g., xylene or ethylbenzene, are useful as solvent (I), especially when the resin is partially aromatic. When it is essentially aliphatic, lower boiling solvents will be found useful. The nature of the resin will also determine solvent (II), since it must boil at a temperature which is below that at which the resin is substantially cured. However, as solvent (II) is removed from the distilling reaction mixture, the temperature of the refluxing mixture rises, whereby "B" stage resin is gradually formed. The "B" stage resin must not be allowed to separate from the reaction mixture; so solvent (II) must be such that, in admixture with solvent (I) it dissolves the "B" stage resin. The choice of solvents thus permits slow curing of the epoxide resin and solution of the cured product as it is formed. A lower alkanol or a mixture thereof with water is particularly useful as solvent (II).

The concentration of the reactants in their respective solvents is immaterial so long as a readily distillable mixture results. However, in order to obtain a homogeneous solution of the liquid resin of the curing agent, it is necessary to use concentrations of liquid resin in solvent (I) that will be within the solubility limitations of the resin. A concentration of curing agent in solvent (II) which is similarly restricted can be readily determined by one skilled in the art of formulating solvent mixtures. In the working examples which follow, solvent (I) is toluene or xylene, and solvent (II) is a mixture of methanol and water. Substantially the same solvents are used with the same resin components in the working examples, thereby to reduce variables and to produce useful data for over-all evaluation. However, selection of other solvents having the required properties is only a matter of routine determination. Generally, it will be found that inclusion of water or an alcohol or some other solvent which provides a hydrogen donor is advantageous in catalyzing the reaction between the resin and the curing agent.

It will also be obvious that in order to make up the reaction mixture from which the solvent is to be distilled, it is not necessary to dissolve separately the epoxide and the amine in respective solvents and then mix the resulting solutions. This is done simply to prevent premature reaction of the resin with the curing agent should a solution of resin and curing agent in a solvent or solvent mixture be allowed to stand before processing. Thus, there may first be prepared a mixture of a solvent for the amine and a solvent for the resin and the resin and curing agent added to the mixture of solvents. It is necessary to have at least two different solvents in the refluxing mixture, for while the lower boiling solvent is distilling off, the resin is being cured. For reaction of the "A" stage resin with the amine, a component in the solvent mixture which is a hydrogen donor, e.g., water or an alcohol, is recommended for advancing the cure at a moderate temperature within a reasonable time. It will be found that even though an alcohol is present as one of the solvents, the addition of water increases reaction rate.

In a distilling mixture of two or more solvents of different boiling points, frequently at least some of the higher boiling material is volatilized off as the lower boiling material is being removed. Therefore, it will often be found that the reaction product remaining after all of solvent (II) has been removed is a very thick syrup, because a large portion of solvent (I) vaporizes during the removal of solvent (II). In such a case, the thick syrup is diluted, either for storage or for immediate use. Dilution to, say, about 1% to 80% solids, inhibits advancement of the resin to the thermoset, infusible "C" stage. Any solvent for the reaction product that is not a hydrogen donor may be used, e.g., acetone, 2-butanone, xylene, etc. Solutions of low concentration, say from about 2% to 10%, may be used as coating or impregnating agents for fibrous textiles in the preparation of laminate composites. In practice, it will be found convenient to work with higher concentration; and, insofar as expediency in storage and transportation is concerned, solutions having a solids content of from about 25% to 65% will be generally preferred. The nature of the solvent will vary, of course, with the intended use of the solution. The volatilizable solvents, e.g., actone, benzene, hexane, etc. will be useful for impregnating and coating purposes. As hereinafter disclosed, the solutions are particularly useful for the production of filler-filled, moldable grains. When used for this purpose, the solvent should advantageously be one which is miscible with a liquid that is a non-solvent for the partially cured resin. Water is the preferred example of such a liquid and a lower ketone such as acetone or 2-butanone are good examples of the preferred solvents for the reaction product.

For preparing the moldable grains, the solids concentration of the solution will usually be from about 25% to 60% by weight of the solution in order that thereby there may be provided sufficient matrix resin. The diluted solution, herein generally referred to as the protomatrix resin solution, is first simply mixed with the filler particles. The quantity of solution is immaterial, so long as the particles are thoroughly wetted by the solution. Usually a slurry of the solution and filler is prepared. Vigorous stirring of the mixture of solution and filler is unnecessary, and generally should be avoided to guard against agglomeration. The mixture or slurry is then treated for recovery of product. This may be done in some cases by rapid cooling or by addition of a nonsolvent. However, possible agglomeration is more readily avoided and a more uniform, granular product is obtained by gradually contacting the mixture of protomatrix solution and filler with a solvent-miscible liquid which is a non-solvent for the partially cured or "B" stage resin, e.g., water or a lower alcohol. Advantageously, said liquid will contain a suspending agent, e.g., a polyelectrolyte such as polyacrylic acid, styrene-maleic acid copolymer, a partially or completely hydrolyzed polyvinyl acetate, or acrylic acid-alkyl acrylate copolymer. The suspending agent is used in very small concentration, e.g., from about 0.01% to 1.0% by weight of said liquid. The liquid may be added to the mixture of protomatrix solution and filler, or the said mixture may be added to the liquid. Preferably, the mixture is gradually added, with stirring, to the liquid. Grains of the resin-enveloped filler form during the addition. Upon filtering or decanting and drying the grains at a temperature which is insufficient to advance the resin to the infusible stage, there are obtained moldable grains which are stable upon storage, i.e., they do not need to be molded immediately to the final, infusible composite. The useful period of the grains is extended by storing them in a refrigerator at about 5° C.

When the solvent of the protomatrix solution is one which is not miscible with water and it is not desired to employ a more expensive liquid for preparing the moldable grains, the solvent may be distilled off from the mixture of protomatrix solution and water, provided that it boils at a temperature which is insufficient to advance the resin to the infusible "C" stage. Distillation under reduced pressure can be used to meet the temperature requirements. Rapid cooling of the residue, e.g., by addition of ice, results in separation of granular product which is then removed from the water and dried as above.

The protomatrix resin solution may also be slurried with the filler and the slurry dried or deposited upon a support to give preforms for final moldings. Also, dispersions of the filler in the protomatrix resin solution may be cast into films which may then be cut into small pieces for molding by conventional means.

The particulate filler which is employed with the presently provided protomatrix solution may be inorganic or organic and of any shape; i.e., it may be a dust or powder, a microbead, a fine platelet or microcrystalline structure or a fiber. As employed herein, the term fiber includes filaments and whiskers. Because of current interest in fiber-reinforced composites, at present the value of the invention is probably most pronounced when related to discontinuous inorganic fibers. Such fibers will be from, say, 0.0001" to 0.5" and, preferably, from 0.03" to 0.3" in length. The fibers will have an aspect ratio of from about 50 to 1500, although, depending upon the nature of the fiber and of the resins used therewith, the fiber diameter may be somewhat lower or higher than that required by such a range. In selecting the most suitable ratio within these limits, it is advantageous to consider the stiffness of the contemplated reinforcing fiber, since materials of high flexibility should be thick enough to maintain a degree of rigidity during processing. Likewise, materials of great rigidity should be thin enough to permit easy distribution. Selection of the proper aspect ratio for each fiber is a matter of routine experimentation.

Glass fiber, being readily available and imparting very good tensile and flexural properties to composite structures, is generally useful. However, from the standpoint of simultaneous mechanical strength and thermal resistance, particularly useful are the inorganic refractory materials, e.g., filaments, fibers or whiskers of boron, graphite, niobium, tantalum, hafnium, tungsten, molybdenum, bronze, copper, lead, silver, stainless steel, silica, silicon carbide, silicon nitride, boron nitride, alumina, sapphire, zirconia, titania, etc.

Naturally occurring fibers such as the asbestos, hemp and bamboo fibers, and synthetic, high-strength organic fibers such as the polypropylene, the polyester and polyamide fibers cut or chopped to the very short lengths may also be used.

The invention is also of significant utility in that it provides for easy preparation of moldable grains for the manufacture of composites such as electricity conductors, radiation shields or thermal or electrical insulators, depending upon the nature of the filler; i.e., the filler may be a fiber or powder or platelet of graphite, carbon or of any of the inorganic or organic, natural or synthetic materials disclosed above.

Previous to application of the protomatrix resin solution to the filler, the latter may or may not be treated with a coupling agent. As is known in the art, bonding of resin to filler is often facilitated by use of a coupling or anchoring agent. Such an agent is usually a bifunctional compound having a reactive group which reacts or becomes otherwise attached, e.g., by hydrogen bonding, to the filler, and another reactive group which reacts with, or is somehow attached to, the matrix resin. With some fillers, a coupling agent serves no purpose and may even hinder bonding; with others, a bonding agent is recommended. In practice, glass fibers are generally coated with a protective coating immediately upon spinning. Such coatings may prevent satisfactory resin-to-glass bonding, and cleaning of the fiber by heating it to burn off the coating, or washing the fiber with a solvent for the coating, is frequently employed. In other instances, the glass fiber, as received, is simply treated with a material which is known to facilitate bonding. In the examples which follow, when a coupling agent was used, it was one of the commercially available ones of the family of silane couplers. Examples of other silanes which may be used are amply disclosed in the U.S. Pat. Nos. 2,832,754 and 2,930,809. Other coupling agents which may be used are, e.g., the Werner type complex compounds such as methacrylatochromic chloride or the compounds of this type described in U.S. Pat. No. 2,552,910. However, use of a coupling agent with a particular filler or a particular epoxide resin forms no critical feature of this invention. The art well recognizes the bonding propensity of the various epoxide resins with the various particulate fillers, numerous coupling agents are available, and it involves only routine experimentation to determine whether a coupling agent is necessary to obtain the coated filler and to select a suitable one if coating does not occur under the otherwise necessary conditions.

The invention is further illustrated by, but not limited to, the following examples.

Example 1.—In this example, a solution of an advanced, but incompletely cured, epoxide resin was prepared from 99.6 g. of Epon–826 epoxide resin and 30 g. of 4,4'-methylenedianiline. The Epon resin had an epoxide equivalent of 186 and the equivalent weight of the methylenedianiline is 99.64. Accordingly, there were used a 0.536 equivalent of Epon and a 0.301 equivalent of methylenedianiline; i.e., on a chemical equivalent basis, the ratio of resin to curing agent was 1.78:1.0.

Reaction was effected as follows: a mixture consisting of 327 g. of methanol, 30 g. of 4,4'-methylenedianiline and 46 g. of water was heated to reflux and to the refluxing solution there was added a solution of 99.6 g. of Epon–826 resin dissolved in 122 g. of toluene. After all of the solution had been added, the container was rinsed with 40 g. of toluene and the rinsings added to the refluxing reaction mixture. Refluxing was continued for 15 more minutes. Then the reaction vessel was placed on a rotary evaporator in a 50° C. water bath and maintained under vacuum for about 1 hour and 40 minutes. There was thus obtained as residue 126.16 g. of advanced resin. It was dissolved in 126.16 g. of acetone, and the resulting solution was diluted with 126.16 g. of benzene. Hereinafter, the diluted solution will be referred to as the "protomatrix resin solution."

The concentration of oxirane oxygen and amine function in the protomatrix resin solution was determined as follows: Employing substantially the procedure of A. J. Durbetaki, Analytical Chemistry, 28, 2000 (1956), samples were quenched in acetic acid and titrated with a standard solution of hydrogen bromide in glacial acetic acid, using crystal violet as indicator. The titre gave the concentration of both the oxirane oxygen and the amine function. In order to determine the amine, a similar procedure was used, except that instead of using the hydrogen bromide, perchloric acid was used. There was thus obtained a value of 1.62 milliequivalents per gram of solution for the oxirane oxygen plus amine, and a value of 0.78 milliequivalent per gram of solution for the amine, alone. The difference, i.e., 0.84, represents the milliequivalents of oxirane oxygen per gram of solution; this corresponds to 0.156 g. of unreacted epoxy function per gram of solution. There thus remains about 58% of the original Epon reactivity in the resin constituents of the protomatrix resin solution; also, each gram of the said solution consists of about 33% by weight of total reacted and unreacted resin components; i.e., there are present in the protomatrix solution some unreacted amine groups, some unreacted epoxide groups, and epoxide resin in which at least some of the epoxide groups had reacted with an amine group.

Example 2.—The protomatrix solution of Example 1 was stored in a closed container at room temperature. Five days later, a sample of the stored solution showed it to have an oxirane oxygen content of 0.81 milliequivalent per gram of solution The same day a slurry of chopped glass fiber (about 1/16" lengths) was prepared from 50 ml. of the solution and the chopped fiber. To the slurry, there was then gradually added a 0.5% aqueous solution of a 96:4 weight ratio acrylic acid-2-ethylhexyl acrylate copolymer (suspending agent) at 25° C. When about 55 ml. of the aqueous solution had been added, grains of product began to appear. Addition of the aqueous solution was continued, with stirring, to give a dilute suspension of granular product. Filtration on a screen and subsequent air-drying gave discrete grains of the resin-enveloped fiber.

In another run, performed concurrently with the above, a slurry of the protomatrix solution and chopped fiber was treated as above with a 0.5% aqueous solution of a vinyl acetate/maleic anhydride copolymer. Here, coagulation and grain formation occurred after only a few milliliters of the aqueous solution had been added, so that, instead of employing gradual addition, the slurry was simply mixed with a large excess of aqueous solution.

Example 3.—Upon eight days of storage, at room temperature, the protomatrix resin solution of Example 1 was determined to have an oxirane oxygen content of 0.76 milliequivalent per gram of solution and to possess about 56% of the original Epon reactivity. The same day, some of the solution was employed for preparing a molding composition wherein the filler was glass fiber which had been milled to approximately 1/32" lengths and treated with γ-glycidopropyltrimethoxysilane coupling agent. The following procedure was used: 200 ml. of water containing 0.25% by weight of a 96:4 weight ratio acrylic acid-2-ethylhexyl acrylate copolymer as suspending agent was warmed to 51° C., and there was added to the warm solution, with stirring, a slurry of 23.3 g. of the glass fiber in 30 g. of the protomatrix resin solution. The whole was then gradually heated to 74° C. within 10 minutes, during which time benzene distilled out. More benzene was removed in the next 2 minutes by flushing with nitrogen, while the temperature was allowed to drop to 72° C. Heating was then discontinued, and the reaction mixture was suddenly cooled by addition of ice water. After about 20 minutes, when the temperature of the mixture was about 10° C. and formation of granular product was noted, the whole was stirred for a few minutes with a lightening mixer and then screened to separate the grains which has been formed.

Immediate microscopic examination at 430× magnification of the entire grain and of the dissected grain showed that the resin was well distributed over the glass fiber, with rounded deposits of the resin enclosing the fiber ends. The several fibers present in each grain were separated from each other by a layer of the resin, with a smooth, uniform coating of the resin enveloping the group of fibers.

After air-drying at room temperature for about 2.5 hours and in the vacuum oven for about the same length of time, there were obtained grains or beads having an oxirane oxygen content of 0.26 milliequivalent per gram, and an oxirane oxygen to amine chemical equivalent ratio of 0.29. Compression molding of the dried product gave a smooth, well-dimensioned test specimen.

Example 4.—Some of the protomatrix solution which was prepared in Example 1 was stored for 11 days at room temperature. Analysis of the solution showed it to have the same oxirane oxygen content as at the end of eight days, i.e., 0.76 milliequivalent per gram of solution, as in Example 3. The 11-day old solution was employed to prepare a molding composition, using the procedure of Example 3, except that the slurry of glass fiber and protomatrix solution was added to the water plus suspending agent at 66° C. rather than at 51° C., flushing with nitrogen was omitted, and ice was used to cool the reaction mixture very gradually within 10 minutes. Upon removal of the water and drying in the vacuum oven for 1 day at room temperature there were obtained soft, but not sticky, discrete grains or beads having a particle size of from 1 to 2 mm. and an oxirane oxygen content of 0.27 milliequivalent per gram. The grains or beads could be dissected easily to reveal substantially uniform distribution of the resin over the fiber segments which were occluded within the resin.

Example 5.—A study was made of the reaction rate between the "A" stage epoxide resin Epon–826 and 4,4'-methylenedianiline in various solvents. A mixture consisting of 100 g. of Epon–826 and 30 g. of the methylenedianiline, in a sufficient quantity of the solvent mixtures shown below to make up 1000 ml. of solution, was refluxed; and, during refluxing, the concentrations of oxirane oxygen and amine function were determined as described in Example 1. Reaction rates, arrived upon from this data, were as follows:

| Solvent: | Reaction rate, m. eq./min./liter |
|---|---|
| 1:1 methanol/acetone | 0.33 |
| 3:1 methanol/acetone | 1.17 |
| 3:1 methanol/acetone+5% $H_2O$ | 1.44 |
| 3:1 methanol/acetone+10% $H_2O$ | 2.13 |
| 3:1 methanol/benzene | 1.49 |
| 3:1 methanol/benzene+5% $H_2O$ | 1.85 |

The above data show that as the concentration of the hydrogen donors, methanol and water, increases, the reaction rate increases, and that water plus methanol has a rate-increasing effect which is greater than that of methanol, alone. The difference in the benzene and acetone effects may be ascribed to the higher refluxing temperature of the methanol/benzene mixture as compared to the methanol/acetone mixture.

Example 6.—This example shows preparation of a protomatrix solution, subsequent addition of the solution to the filler, and recovery of the resulting resin-coated filler by treating the mixture of solution and filler with water containing a suspending agent.

Solution I was prepared by dissolving 249.0 g. Epon–826 in 355.0 g. xylene. Solution II was prepared by dissolving 76.0 g. 4,4'-methylenedianiline in a mixture of 817.5 g. methanol and 114.0 g. water. To produce the protomatrix resin, a 1-neck, 3-liter flask fitted with a reflux condenser attached through a Y-adapter was charged with 966.2 g. of solution II, which was then heated to reflux with stirring; and 579.8 g. of solution I was rapidly added thereto from a dropping funnel at the Y-adapter. The whole was quickly brought to reflux, and after refluxing for 10 minutes, it was concentrated to a thick syrup during about the next hour. Analytical specimens taken at the end of reflux and end of evaporation, employing the procedures described in Example 1, showed that during the evaporation the oxirane oxygen content of the mixture had decreased from 6.62 milliequivalents to 2.79, and the oxirane/amine ratio from 1.66 to 1.33. The thick syrup, from which the methanol and water and most of the xylene had been vaporized, was determined to contain 0.942 g. of resin components per gram of syrup; and the 324 g. of product (containing 305 g. resin components and 19 g. solvent) was diluted with 286 g. acetone to give a protomatrix resin solution containing 50% solids. This solution was determined to have an oxirane oxygen content of 1.48 milliequivalents per gram of solution.

In order to determine the stability of the 50% solids protomatrix solution thus obtained, samples thereof were kept in stoppered bottles at respective temperatures of 25° C. and 5° C. and the oxirane oxygen content determined at the end of the periods shown below. The following results were obtained:

|  | Oxirane oxygen, 25° C.: | M. eq./g. of solution 5° C. |
|---|---|---|
| Age of solution, days: | | |
| 0 | 1.48 | 1.48 |
| 5 | 1.35 | 1.41 |
| 12 | 1.31 | 1.39 |
| 26 | 1.15 | 1.36 |

Previous to application of the protomatrix resin solution, glass fiber (20-end roving, Ferro Corporation, Type 1014, chopped into 1/32" lengths) was treated with a silane coupling agent as follows: A 3-liter flask was fitted with a stirrer, electric heating mantle, reflux condenser and thermometer, and charged with 30 g. of the chopped glass fiber and 2500 ml. of acetone. After stirring 10 minutes for washing, the acetone was removed by suction with a filter stick, and replaced by a solution of 0.09 g. of γ-aminopropyltriethoxysilane in 2500 ml. water. The slurry was stirred gently to avoid balling the fibers, heated to 70° C. and held at this temperature for 10 minutes. After the water was removed by the filter stick, the fibers were washed twice with one-liter portions of acetone.

The protomatrix resin was deposited as follows upon the silane-treated fibers thus obtained: 30 g. of the above freshly prepared 50% solids solution of protomatrix resin was added, dropwise, to a thick slurry of 77 g. of acetone and about 15 g. of the glass fiber. During the addition, gentle mixing was employed, using a lifting motion to avoid balling the fibers. The resulting mixture was precipitated in granular form by gradually adding it, with moderate stirring, to 3 liters of an 0.17% aqueous solution of a 96:4 weight ratio acrylic acid-2-ethylhexyl acrylate copolymer (suspending agent) at a temperature of 0° C. to 5° C. The resulting suspension was diluted with ice water, the water was siphoned off, and the residue was washed twice with ice cold water to remove acetone and suspending agent. After draining off the water, the product was dried in a vacuum oven overnight at room temperature to give hard, discrete granules.

The above granules were used as follows: After charging them into a positive pressure mold having a 2" x 6" cavity which had been coated with a fluorocarbon release agent, molding was conducted by gradually heating from 25° C. at 1200 p.s.i. to 150°–160° C. at 5000 p.s.i. and holding under the latter conditions for 15 minutes. The maximum pressure was maintained on the mold while it was cooled to below 60° C. Curing was completed by heating for 3 hours at 150° C., followed by 3 hours at 80° C. Strips (¾" x 6") were cut from the molding and evaluated on the Instron Tester, using an extensometer. The following results were obtained:

Tensile strength—15,600 p.s.i.
Modulus of elasticity—2,100,000 p.s.i.
Elongation—1.0%.
Specific tensile strength—258,000 p.s.i.
Specific modulus—34,700,000 p.s.i.

The presently provided hard, discrete granules of encapsulated fibers soften upon heating and readily flow under pressure: the above compression molded test specimens were smooth and free of protruding fiber ends. Photomicrographs of the molded material shows uniform distribution of the fiber, with the matrix resin completely enveloping a single fiber; each fiber thus remains a highly individualized entity in the composite, thereby contributing significantly to the very good performance of the molded product.

Both the protomatrix resin solution and the moldable granules prepared therefrom are stable upon storage; i.e., neither needs to be used immediately for preparing the final, thermoset product, as is the case with thermosettable intermediates, generally, which require that upon contact of resin component with the curing agent or catalyst the mixture be processed almost at once to the set product. For the molding industry, this invention thus provides two new and valuable articles of commerce: a single solution of resin components which can be used directly as impregnating agent for the production of thermosettable forms or laminates or granular molding compositions; and moldable grains wherein the filler is occluded, whereby the molder can dispense not only with the necessity of mixing the resin with the curing agent, but also with the cumbersome use of liquid, difficultly processed materials which require tedious clean-up of equipment after use.

It is to be understood that although the invention has been described with specific reference to particular embodiments thereof, it is not to be so limited since changes and alterations therein may be made which are within the full intended scope of this invention as defined by the appended claims.

What I claim is:
1. The method of preparing a resinous reaction product which comprises heating a solution consisting essentially of "A" stage epoxide resin and hydrocarbon amine curing agent therefor in a chemically equivalent ratio of from 1.5:1.0 to 2.0:1.0 in a mixture of solvents consisting essentially of
   (I) a solvent for the liquid resin and for its partially cured "B" stage product and for the amine, and which boils above the temperature at which substantial advancement of the "A" stage resin to its "B" stage product occurs during the time of said heating, and
   (II) a solvent for the amine, for the liquid resin, and, in admixture with solvent (I), for the "B" stage product of the liquid resin, and which boils below the boiling point of solvent (I) and below the temperature at which substantial advancement of the "A" stage resin to its "B" stage product occurs during the time of said heating, said heating being conducted to distill off substantially all of said solvent (II), the quantity of (II) being such that upon distilling off substantially all of (II) there is obtained as residue a viscous, resinous reaction product wherein the oxirane oxygen content of said solution before heating has been reduced by from about 20% to 80%.

2. The method defined in claim 1, further limited that at least one of said solvents (I) and (II) comprises a hydrogen donor.

3. The method defined in claim 1, further limited in that said reaction mixture is formed by mixing a solution of the liquid resin in solvent (I) with a solution of the amine in solvent (II).

4. The method defined in claim 3, further limited in that solvent (I) is an aromatic hydrocarbon and solvent (II) is a mixture of a lower alkanol and water.

5. The method of preparing moldable grains comprising reinforcing filler particles enveloped by a partially cured epoxide resin, which method comprises mixing the particles with a solution, in an inert, organic, liquid solvent, of the reaction product obtained by reacting a normally liquid "A" stage epoxide resin with a hydrocarbon amine curing agent in chemical equivalent ratios of 1.1:1.0 to 2.0:1.0 to reduce the oxirane oxygen by about from 40% to 80%, and recovering said grains from the resulting mixture by heating the mixture with water to drive off the solvent, rapidly cooling the residue, and removing water from the residue.

References Cited
UNITED STATES PATENTS

| | | | |
|---|---|---|---|
| 3,215,663 | 11/1965 | Weisberg | 260—34.2X |
| 3,330,807 | 7/1967 | Weisner | 260—33.4(Ep)X |
| 3,342,775 | 9/1967 | Aelony | 260—32.8(Ep)X |
| 3,349,060 | 10/1967 | Lewis et al. | 260—47 |
| 3,409,591 | 11/1968 | Landua et al. | 260—47 |
| 3,409,592 | 11/1968 | Landua et al. | 260—47 |

OTHER REFERENCES

Lee et al.: Epoxy Resins, McGraw-Hill Book Co., Inc., 1957, pp. 51–53, Sci. Lib.

MORRIS LIEBMAN, Primary Examiner

L. T. JACOBS, Assistant Examiner

U.S. Cl. X.R.

260—33.6, 34.2